United States Patent [19]

Endo et al.

[11] Patent Number: 4,871,577
[45] Date of Patent: Oct. 3, 1989

[54] NEW MODIFIED GLUTEN PRODUCT AND BREAD IMPROVER COMPOSITION

[75] Inventors: Shigeru Endo, Kawagoe; Yoshie Negishi; Kiwamu Shiiba, both of Saitama, all of Japan

[73] Assignee: Nisshin Flour Milling Co., Ltd., Tokyo, Japan

[21] Appl. No.: 40,815

[22] Filed: Apr. 21, 1987

[30] Foreign Application Priority Data

Apr. 25, 1986 [JP] Japan ................................. 61-96205
May 14, 1986 [JP] Japan ................................. 61-110103
May 14, 1986 [JP] Japan ................................. 61-110104

[51] Int. Cl.$^4$ .............................................. A21D 2/00
[52] U.S. Cl. .................................... 426/653; 426/656
[58] Field of Search ...................... 426/549, 653, 656

[56] References Cited

FOREIGN PATENT DOCUMENTS 1074087 6/1967 United Kingdom .

OTHER PUBLICATIONS

Tsen, CC, "Ascorbic Acid as a Flour Improver," *The Bakers Digest*, Oct. 1964.

*Primary Examiner*—Donald E. Czaja
*Assistant Examiner*—Celine T. Callahan
*Attorney, Agent, or Firm*—Larson and Taylor

[57] ABSTRACT

A new water-insoluble modified gluten product and a new water-soluble proteinaceous substance have now been found to be produced by kneading a mixture of wheat flour, one or more oxidizing agents such as L-ascorbic acid, potassium boromate, ammonium persulfate and potassium iodate, and water and then separating or fractionating the resulting dough-like or batter-like, hydrated flour mixture as kneaded, for instance, by repeated water-washing or centrifugation, so as to give individually a fraction comprising the water-insoluble modified gluten product, a fraction comprising an aqueous solution containing the water-soluble proteinaceous substance dissolved therein, and a fraction comprising the starchy substances and if necessary, subsequently dehydrating said aqueous solution.

The water-insoluble modified gluten product and the water-soluble proteinaceous substance so obtained as well as a mixture of these are each useful as new bread improver for addition to farinaceous flours or bread-making doughs for the purpose of improving the properties of bread or other bakery products, such as the volume, crumb texture and crumb smoothness of bread.

11 Claims, No Drawings

NEW MODIFIED GLUTEN PRODUCT AND BREAD IMPROVER COMPOSITION

SUMMARY OF THE INVENTION

This invention relates to new bread improvers or additives which are produced from a kneaded mixture of hydrated wheat flour, one or more oxidizing agents and water. These new bread improvers or additives are intended for addition or incorporation to a flour or dough for the purpose of improving the volume, the crumb structure or texture, the crumb smoothness and the external appearance of bread or other bakery products as prepared from such flour or dough. This invention also relates to a method for making a bakery product using such new bread improver. This invention further relates to a new modified gluten product which is prepared by separating from the kneaded mixture of hydrated wheat flour, one or more oxidizing agents and water and which is useful as the additives to flour or dough for making bread or other bakery products.

BACKGROUND OF THE INVENTION

Hithertobefore, principally, gluten has been produced according to the Martin process or dough-ball process wherein wheat flour is mixed with a volume of water. The resulting mixture is then kneaded into a dough and the dough is allowed to stand for a while until the gluten product and also the starch substance have well been hydrated to form a hydrated flour mass. The hydrated mass is then repeatedly washed with volumes of water further added to separate the vital gluten and the milky starch substance from the dough-like, hydrated flour mass. Alternatively, gluten has been produced according to the Batter process wherein wheat flour is mixed with a larger volume of water and the resulting mixture is then kneaded to form a smooth and elastic batter. This batter is then allowed to stand for a while and subsequently washed with a 2-fold to 5-fold volume of water to give the gluten the form of small curd-like aggregates and the milky starch substance. Next the gluten aggregates and the milky starch substance are separated from each other by passing through a vibrating screen of 60–150 mesh so that the curd-like, vital gluten is recovered.

The conventional vital gluten as produced by the above-mentioned prior art methods generally finds many and different applications, for instance for: the preparation of baked solid wheat gluten based-bread (called "Fu" in Japanese), the production of sodium glutamate as a seasoning agent, the preparation of a gluten hydrolysate containing amino acids for use as an extender for Japanese soy sauce (called "Sho-yu" in Japanese), and the production of new proteinous food products and the like. As one of the many applications of the vital gluten, the addition of the vital gluten to farinaceous bread flour to improve its bread-making properties is also known. However, the effects of the conventional vital gluten for the improvement of the bread-making properties of the farinaceous bread flour are still not satisfactory.

Further, it is also known that some proteinaceous materials are added to the farinaceous bread flour to provide a high protein bread (U.K. Patent Nos. 1,074,087 and 1,472,738, for example) and that one of the modified gluten products comprising the reaction product of vital gluten and xanthan gum or a hydrophobic liquid is added to the farinaceous bread flour in order to improve the properties of the bread product (U.S. Patent Nos. 4,198,438 and 4,396,637).

Furthermore, it is known that an oxidizing agent such as L-ascorbic acid, potassium bromate and others; a reducing agent such as glutathione, cystein and the like; enzymes such as amylase, protease and the like; and an emulsifier such as aliphatic acid esters of glycerine, aliphatic acid esters of saccharide and the like, as well as wheat flour protein such as certain activated gluten are used as the bread improver or bread-improving additive for improving the bread-making properties of the farinaceous bread flour (see, for example, Japanese patent publication No. 29685/86; U.K. Patent No. GB 2126867B; and "Cereal Chemistry" Vol. 57, No. 3, pp. 169–174 (1980); Vol. 58, No. 5, pp. 384–391 (1981), published from The American Association of Cereal Chemists).

These known bread improvers are yet not satisfactory as their effects of improving the properties of bread are not sufficient and as some of the known bread improvers can occasionally give rise to unfavorable flavor and taste of the bread products.

In these circumstances, the demand still exists for new bread improvers which can satisfactorily improve the properties of bread products and other bakery products.

We, the present inventors, have done research in an attempt to provide new bread improvers which can exert satisfactorily the better effects for improving the properties of bread. As a result, we have now found that when the known process of preparing gluten from wheat flour is carried out in such a modified manner that one or more oxidizing agents are added to the raw wheat flour and the resulting mixture is then kneaded with addition of water to form a dough-like or batter-like kneaded mixture of hydrated wheat flour, the oxidizing agent and water, it is possible to recover or separate a new, modified gluten product from said dough-like or batter-like knead mixture. This is done by washing this kneaded mixture repeatedly with water and isolating the water-insoluble gluten fraction from the water-insoluble starch fraction or starchy material and also from the water-soluble fraction existing in said kneaded mixture of the hydrated wheat flour, the oxidizing agent and water. The modified gluten product so recovered or separated is useful as a bread-improver, namely the additive for improving both the bread-making properties of the flour and the properties of bread or other bakery products, such as the volume, the crumb structure or texture, the crumb smoothness or chewing mouth feel and the external appearance of bread.

Further, we have now found that when the above-mentioned new modified gluten product is recovered or separated from the dough-like or batter-like kneaded mixture of the hydrated flour, the oxidizing agent and water, it is also possible to recover separately a water-soluble proteinaceous fraction or substance from the water-insoluble starch fraction or substance existing in said dough-like or batter-like kneaded mixture. This water-soluble proteinaceous fraction or substance so recovered is also useful as an additive for improving the properties of the wheat flours and the bread products or other bakery products as prepared from the flours. It also has been found that this water-soluble proteinaceous substance so recovered can exert their effects of improving the properties of wheat flours and bread to a satisfactory extent especially when this substance is incorporated to the farinaceous bread flour at a smaller proportion than said new water-insoluble, modified gluten product now prepared by the present inventors.

On the other hand, in recent years, various machines such as the dough divider, rounder, molding machine and so on have been employed in the process of making bread in large scale. Particularly, the dividing and scaling of the dough into small balls or masses and the making-up of these small masses of the dough are conducted by machines rather than by hands of men. However, when the dough masses have been divided, scaled and made-up by the mechanical working of the machines, it is likely that the bread products as prepared by baking such mechanically worked dough show a reduced volume and a reduced crumb texture, as compared to the bread products which are prepared from the hands-worked dough. Accordingly, it is desirable that the dough for making the bread is tolerant to the mechanical workings in the sense that the bread as prepared even by baking the mechanically worked dough can still give a satisfactorily large volume and good crumb structure or texture as much as the bread as prepared from the hand-worked dough. Therefore, there exists a great demand for a new bread improver which can provide a bread-making dough tolerant to the mechanical workings in the above sense.

As one result of our research, we have now found that a proteinaceous composition comprising a mixture of the above-mentioned new modified gluten product and the above-mentioned water-soluble proteinaceous fraction or substance which both have been separated from the aforesaid kneaded mixture of the hydrated wheat flour, the oxidizing agent and water is again useful as a new bread improver which can provide the bread-making dough tolerant to the mechanical workings in the sense described above.

This invention has been accomplished on the basis of the above findings of the present inventors.

DETAILED DESCRIPTION OF THE INVENTION

According to the first aspect of this invention, therefore, there is provided a new bread improver intended for addition to wheat flour or dough for improvement of the volume, the crumb structure and the crumb smoothness of bread. This bread improver is selected from (A) a bread improver consisting essentially of a water-insoluble, modified gluten product which is prepared by kneading a mixture of wheat flour, one or more oxidizing agents and water, then washing the resulting hydrated flour mixture so kneaded with water and separating the water-insoluble, modified gluten product from the starch and the water-soluble proteinaceous substance of said hydrated flour mixture, (B) a bread improver consisting essentially of a water-soluble proteinaceous substance which is prepared by kneading a mixture of wheat flour, one or more oxidizing agents and water, then washing the resulting hydrated flour mixture so kneaded with water and separating the water-soluble proteinaceous substance from the starch, the water-insoluble, modified gluten product and the other water-insoluble matters present in said hydrated flour mixture, and (C) an bread improver consisting essentially of a proteinaceous composition which is prepared by admixing the aforesaid water-insoluble, modified gluten product (A) with the aforesaid water-soluble proteinaceous substance (B).

The term "kneading" as used herein means that the mixture of wheat flour, the oxidizing agent and water is agitated and mixed uniformly to a degree sufficient invoke that the gluten protein is produced from the initial protein components present in the raw wheat flour. The term "hydrated flour mixture" as used herein means and embraces such semi-solid mass or so-called dough which is obtained by kneading a mixture of wheat flour, the oxidizing agent and a small proportion of water, and such milky suspension mass or so-called batter which is obtained by kneading a mixture of wheat flour, the oxidizing agent and a large proportion of water.

Now, the methods for the preparation of the new bread improvers according to this invention are described below.

Amongst the bread improvers of this invention, the bread improver (A) consisting essentially of the water-insoluble, modified gluten product may be produced substantially in the same manner as in the conventional processes of preparing the known vital gluten, except that one or more oxidizing agents is or are incorporated additionally when the mixture of wheat flour and water is kneaded to form the dough-like or batter-like, hydrated flour mixture.

In the practice of this invention, no particular limitation is imposed on the nature or sort of the wheat flour employed. Any sort of wheat flour which is prepared by the conventional method of milling any sort of wheat cultivated may be available. For the preparation of the bread improver (A) consisting of the modified gluten product-type, however, strong wheat flour, that is, high-protein, hard-wheat flour is preferred in particular.

Any oxidizing agent may be used so long as it is usable for foods. As illustrative examples of the oxidizing agent, may be mentioned L-ascorbic acid, potassium bromate, ammonium persulfate, potassium iodate and the like. They may be used either singly or in combination.

Usually, L-ascorbic acid is a reducing agent, but during the dough-mixing of wheat flour, the L-ascorbic acid is subjected to the action of wheat enzyme and oxidized rapidly to dehydroascorbic acid, which can act as an oxidant, as be detailed previously.

In order to produce the modified gluten product for use as the bread improver (A) of this invention, wheat flour, the oxidizing agent and water are mixed together and kneaded, first of all. The proportion of the oxidizing agent may preferably be 10–1,000 ppm, notably, 50–500 ppm based on the wheat flour. Any proportions of the oxidizing agent of less than 10 ppm will not be able to provide a modified gluten product having the effects sufficient to improve the bread-making properties. On the other hand, any proportions of the oxidizing agent in excess of 1,000 ppm will result in difficult formation of the modified gluten or the formation of a gluten tinged in a reddish color. It is therefore undesirable to use the oxidizing agent in any proportions outside the above range.

In general, the proportion of water may preferably be 40%–300% by weight of the wheat flour employed. The oxidizing agent may be added to the wheat flour but may preferably be dissolved in water. The kneading can be effected by a method known per se in the art. Where the amount of water added is as low as 40%–150% by weight of the wheat flour, the kneading may preferably be effected at 5°–40° C. for 1–20 minutes in a vertical dough mixer or the like. A semi-solid and dough-like, hydrated flour mixture is obtained in this manner. Where the amount of water added is as high as an amount of more than 150% to 300% by weight of wheat flour, it is preferable to conduct the kneading at a revolution speed of 1,000–15,000 rpm. for 1–20 minutes in a homogenizer, homo-mixer or the like. A batter-like, hydrated flour mixture is obtained in this manner.

The dough-like or batter-like hydrated flour mixture thus obtained is then processed in a usual manner known in the preparation of gluten. For example, after allowing said mixture to stand for a while if necessary, said mixture is subjected to repeated water-washing and then to screening, centrifugation or other methods so that the gluten product and the starchy material are separated from each other and also from the water-soluble components of the present in said mixture.

The resultant modified gluten product may be used as a raw or wet gluten material as such, or alternatively it may be dried into gluten powder by a dehydrating method such as freeze-drying, spray-drying or hot-air-drying. Of the modified gluten products obtained in the above-described process, a modified gluten product as separated from the semi-solid, dough-like hydrated flour mixture having the lower water content is particularly better in the effects for improving the bread-making properties.

When the modified gluten product as the bread improver (A) of this invention is added to farinaceous flour for production of bread, the bread product prepared will have an increased volume, white and well-extended cellular crumb, improved external appearance and improved crumb smoothness for better chewing mouth feel. Furthermore, the fermentation or leavening time required in the bakery process of making bread can be shortened by about 60 minutes in the straight-dough process and by about 90 minutes in the sponge-dough process. Upon use of the modified gluten product as prepared by this invention as the bread improver, it is preferable to add the improver in an amount of 0.1–10%, especially 0.5–5% by weight based on the farinaceous flour for making bread.

In addition, the modified gluten product prepared as above can also be used as a raw material for production of artificial meat, baked wheat-gluten bread or the like.

According to a particular embodiment of the first aspect of this invention, the bread improver (A) of this invention may be (a) a bread improver consisting essentially of a water-insoluble, modified gluten product which is prepared by: kneading a mixture of wheat flour, one or more of L-ascorbic acid, potassium bromate, ammonium persulfate and potassium iodate as the oxidizing agent in a proportion of 10 to 1,000 ppm. of the oxidizing agent based on the weight of the wheat flour and water in a proportion of 40 to 300% of water based on the weight of the wheat flour, at a temperature of up to 40° C., washing the resulting hydrated flour mixture so kneaded with water and separting the water-insoluble, modified gluten product from the starch, the other water-insoluble matters and the water-soluble proteinaceous substance present in said kneaded, hydrated flour mixture.

Next, the bread improvers according to this invention also include the bread improver (B) consisting essentially of the water-soluble proteinaceous substance which is prepared by: kneading the mixture of wheat flour, one or more oxidizing agent and water, then washing the resulting hydrated flour mixture so kneaded with water and separating the water-soluble proteinaceous substance from the starch and the water-insoluble, modified gluten product present in said kneaded, hydrated flour mixture. For the preparation of this type of bread improver (B), at first, either the kneaded semi-solid or dough-like hydrated flour mixture of wheat flour, the oxidizing agent and water, or the kneaded batter-like hydrated flour mixture of wheat flour, the oxidizing agent and water is produced in the same manner as in the process of preparing the bread improver (A) of this invention which consists essentially of the water-insoluble, modified gluten product as described hereinbefore. The kneaded, dough-like hydrated flour mixture so produced may then be repeatedly mixed and washed with water while being kneaded further together with the water added for the washing, when the water-insoluble, modified gluten product as formed are deposited into solid aggregates or balls and an aqueous suspension containing the water-soluble proteinaceous substance dissolved in the aqueous phase as well as the starch particles and the water-insoluble residual particles of wheat flour dispersed in the aqueous phase is formed. This aqueous suspension is separated completely from the aggregates of the gluten product, for instance, by filtration or screening and the aqueous suspension so separated is then centrifuged to remove any water-insoluble particles and the starch particles therefrom and recover the aqueous solution of the water-soluble proteinaceous substance dissolved therein. When this aqueous solution is dehydrated, for example, by freeze-drying, there is obtained the bread improver (B) of this invention consisting essentially of the water-soluble proteinaceous substance or fraction or composition which is initially present in said kneaded, dough-like hydrated flour mixture.

On the other hand, when the batter-like hydrated flour mixture having a water content of more than 150% to 300% by weight of the wheat flour content is produced, this mixture may be allowed to stand until the starch particles and the other water-insoluble matters are deposited from the aqueous phase containing the water-soluble proteinaceous substance or fraction dissolved therein. Subsequently, this aqueous phase may be separated from the starch particles and the water-insoluble matters by centrifugation, and the aqueous phase so separated is dehydrated by freeze-drying to give the bread improver (B) of this invention which consists essentially of the water-soluble proteinaceous substance or fraction. In case the batter-like hydrated flour mixture is to be produced from the wheat flour, the oxidizing agent and water in a proportion of more than 150% to 300% of water by weight of the wheat flour, it is preferred that the "kneading" of the mixture is effected under such conditions of the agitation, including the agitation speed, agitation time and temperature which are set as follows. Thus, the agitation conditions such as the agitator speed, agitation time and temperature are so controlled that the batter obtained after the agitation would not show the beginning of the segregation of the water-insoluble particles of wheat flour from the aqueous phase within one minute upon the static standing of the batter, and that the yield of the gluten ball (wet gluten) present in the water-insoluble matters or fraction as obtained upon the separation of the water-soluble substance or fraction from said batter would be higher than the value of 2.2 times as much as the initial protein content present in the original wheat flour employed For instance, when a mixture of 200 g of a wheat flour having a protein content of 12.8%, 0.02 g (100 ppm.) of L-ascorbic acid and 500 ml (250%) of water was agitated by means of a home cooking mixer of 500 ml-capacity, favorable outcomes may be obtained by effecting the agitation at room temperature (20° C.) for 2 minutes with rotary agitation speed of 14000 rpm. In this case, the yield of the gluten ball (wet gluten) amounted to 63.2 g (corresponding to 2.5 times the initial protein content of the original wheat flour employed). Upon continued agitation for a further 30 minutes, it was observed that the yield of the gluten ball (wet gluten) fell down to 54.7 g (corresponding to 2.1 times the initial protein content of the original wheat flour), leading to an unfavorable result in that the yield of the modified gluten product recovered can then be decreased and the bread-improving ability of the modified gluten product recovered can then be significantly degraded.

For separating the water-soluble proteinaceous substance or fraction useful as the bread-improver (B) of this invention from the dough-like or batter-like, hydrated flour mixture prepared as above, however, any process or measure may be employed as long as it enables the water-insoluble substance or fraction to be separated distinctly from the water-soluble proteinaceous substance or fraction. For instance, the dough or batter may be allowed to stand for a while, if necessary, and then it may preferably be subjected to repeated water-washing process and subsequent screening and centrifugation. The water-insoluble materials so separated normally comprises the gluten product and the starch substance which may then be isolated from each other and used for any purposes.

The water-soluble proteinaceous substance or fraction which has been separated from the batter-like or dough-like, hydrated flour mixture according to the above-described procedures may be used as such for the bread-improver (B) of this invention, but preferably it may be dried into the form of a powder. To this end, any dehydrating method may be employed as long as it cannot denature the components, particularly the proteinous components present in said water-soluble proteinaceous substance or fraction obtained. The available dehydration methods include freeze-drying, spray-drying, hot-air-drying and the like, but freeze-drying and spray-drying are preferred. It is also possible to make modified wheat flours when the water-soluble proteinaceous substance obtained in the form of aqueous solution is directly added and adsorbed into an amount of bread-making wheat flour, followed by drying the flour according to a known fluidizing dehydration method.

The bread-improver (B) of this invention prepared as above is able to increase the bread volume and improve remarkably the crumb structure or texture, the crumb smoothness and the external appearance of the bread product when it has been added into the bread-making farinaceous flour only at a small amount of e.g. 0.05%–5%, preferably 0.1%–2% by weight of said flour.

The bread improver (B) of this invention may preferably be (b) a bread improver consisting essentially of the water-soluble proteinaceous substance which is prepared by: kneading a mixture of wheat flour, one or more of L-ascorbic acid, potassium bromate, ammonium persulfate and potassium iodate as the oxidizing agent in a proportion of 10 to 1000 ppm. of the oxidizing agent based on the weight of the wheat flour and water in a proportion of 40 to 300% of water based on the weight of the wheat flour, at a temperature of up to 40° C, washing the resulting hydrated flour mixture so kneaded with water and separating the water-soluble proteinaceous substance from the starch, the other water-insoluble matters and the water-insoluble, modified gluten product present in said kneaded, hydrated flour mixture.

Besides, the bread improver according to the first aspect of this invention may be (C) a bread improver consisting essentially of a proteinaceous composition or mixture which is prepared by mixing the bread improver (A) of this invention consisting of the water-insoluble, modified gluten product as described hereinbefore, with the bread improver (B) of this invention consisting of the water-soluble proteinaceous substance as described hereinbefore. It is preferred that the ratio of the bread improver (A) to the bread improver (B) as mixed is in a range of 1:0.1 to 1:100 by weight, especially in the range of 1:0.1 to 1:50 by weight, on the dry weight basis. A dried form of the bread improver (A) may be mixed with a dried or wet form of the bread improver (B), or a wet form of the bread improver (A) may be mixed with a wet or dried form of the bread improver (B), if necessary, followed by drying the resulting wet mixture. Thus the bread improver (C) of this invention is provided either in the dried form or in the wet form.

The bread improver (C) of this invention so prepared is able to provide a dough for bread-making which has an excellent tolerance to the mechanical workings such as the dough-dividing, scaling and making-up in the sense explained hereinbefore. Also, it is able to increase the bread volume and improve remarkably the crumb structure, the crumb smoothness and the external appearance of the bread product. This is accomplished when it has been added into the bread-making farinaceous flour only at a small amount of e.g. 0.05%–5%, preferably 0.1%–2% by weight of said flour.

According to a further aspect of this invention, there is provided a process for making a bakery product, which comprises preparing a dough from a farinaceous composition containing wheat flour and an effective amount of a bread improver according to this invention as described above, and heat-treating or baking the resulting dough to provide the desired bakery product.

The bread improver (A) in accordance with the first aspect of this invention is composed of the water-insoluble modified gluten product as described hereinbefore. This modified gluten product is a novel product and is useful not only as the bread improver but also as an additive or a starting material for another applications, including the preparation of proteinous food products and the like.

According to a third aspect of this invention, therefore, there is provided, as a new product or material, a water-insoluble, modified gluten product which is prepared by: kneading a mixture of wheat flour, one or more oxidizing agents and water, then washing the resulting hydrated flour mixture so kneaded with water and separating the water-insoluble, modified gluten product from the starch and the water-soluble proteinaceous substance present in said kneaded, hydrated flour mixture.

The actual and exact composition of the above-mentioned water-insoluble, modified gluten product according to the third aspect of this invention has not yet been elucidated by the present inventors. Meanwhile, we have investigated the actual composition of said modified gluten product of this invention, and it has now been found that the new modified protein product of this invention contains the n-hexane-extractable free lipids at a total amount of about 1.5% to about 2% by weight and the bound lipids (not extractable with n-hexane but extractable with water-saturated n-butanol) at a total amount of about 4% to about 5% by weight. This is in contrast to the conventional vital gluten which normally contains the free lipids at a total amount of about 0.9% to about 1.5% by weight and the bound lipids at a total amount of about 6% to 7% by weight. Also, the new modified gluten product of this invention contains no substantial amount of free aliphatic acids extractable with ethyl ether but contains monoglycerides at a total amount (e.g. about 30% or more) higher than those present in the conventional vital gluten which normally contains monoglycerides in at a total amount of about 18% (as % of the total free lipids extractable with ethyl ether). Furthermore, it has now been found that the new modified gluten product of this invention and the conventional vital gluten both contains triglycerides at total amount of about 65% or more or less (as % of the total free lipids extractable with ethyl ether).

According to a particular embodiment of the third aspect of this invention, there is provided a water-insoluble, modified gluten product which is prepared by kneading a mixture of wheat flour, one or more of L-ascorbic acid, potassium bromate, ammonium persulfate and potassium iodate in a total proportion of 10 to 1000 ppm. of the oxidizing agent based on the weight of the wheat flour and water in a proportion of 40% to 300% of water based on the weight of the wheat flour, at a temperature of up to 40° C., washing the resulting hydrated flour mixture so kneaded with water and separating the water-insoluble, modified gluten product from the starch, the other water-insoluble matters and the water-soluble proteinaceous substance present in the hydrated flour mixture. This modified gluten product contains the n-hexane-extractable free lipids at a total amount of about 1.5% to about 2% by weight and the bound lipids (not extractable with n-hexane but extractable with water-saturated n-butanol) at a total amount of about 4% to about 5% by weight. Further, this modified gluten product contains no substantial amount of free aliphatic acids which are extractable with ethyl ether, but contains the monoglycerides in amounts higher than those present in the vital gluten.

The above composition of the simple lipids such as the aliphatic acids, monoglycerides and triglycerides present in the water-insoluble, modified gluten product of this invention was determined in such way that a dried sample of the modified gluten product was extracted with ethyl ether in Soxhlet's extractor and the extract obtained was separated by thin layer chromatography (TLC) (eluent: hexane-ethyl ether-acetic acid, 80:20:1) and the corresponding areas of these aliphatic acids, monoglycerides and triglycerides appearing in the chromatogram were quantitatively analysed using a ensitometer (Dual-Wavelength Chromoto-Scanner, CS-930, Shimadzu Co.).

According to our further study, it has been found that the water-soluble proteinaceous substance or fraction obtained as the bread improver (B) of this invention normally contains the free lipids at a total amount of about 0.6% to about 1% and the bound lipids at a total amount of about 3% to about 4%. Its simple lipid was composed of about 80% or more or less of monoglycerides and about 20% or more or less of triglycerides. In contrast, the conventional vital gluten normally contains the free lipids at a total amount of about 0.15% to about 0.35% and the bound lipids at a total amount of about 3.2% to about 4% and also contains the ethylether-extractable aliphatic acids at a total amount of about 26%. Its simple lipid was composed of about 26% of monoglycerides and about 48% of triglycerides.

Furthermore, we carried out some experiments wherein a dried sample of the water-insoluble, modified gluten product of this invention or a dried sample of the water-soluble proteinaceous substance obtained as the bread improver (B) of this invention was extracted with an aqueous solution of 1% of sodium dodecyl sulfate (SDS). The protein components soluble in the resulting extract were reduced and thereafter the molecular weights distributions of the protein components were studied by a sodium dodecy sulfate-polyacrylamide gel electrophoresis (SDS-PAGE). The graphs of the above electrograms showing the distribution of the molecular weights for the SDS-soluble proteins, were analyzed by a densitometer. They exhibited a distinctly different pattern, in comparison with that of those SDS-soluble proteins which were extracted similarly from the conventional vital gluten or from a conventional water-soluble proteinaceous substance as prepared by the same separation method as in this invention.

The effect of a dried sample of the water-insoluble, modified gluten product of this invention or the effect of a dried sample of the water-soluble proteinaceous substance obtained as the bread improver (B) of this invention which is exerted on the rheological properties of a wheat flour dough has now been studied by a Brabender Do-Corder (see, e.g. the "Cereal Chemistry" Vol. 57, No. 3, pp. 169-174 (1980)). The resulting Do-Corder curves for doughs containing 1.0% of the vital gluten as well as for doughs containing 0.2% of the water-soluble proteinaceous substance obtained by the separation method according to this invention have been found to show clearly two peaks at 75° and 85° C. With the Do-Corder curves for the doughs containing the bread improver of this invention, the major peak (for the higher consistency) shifted from 75° C. to 85° C., as distinct from the Do-Corder curves for the doughs containing the conventional vital gluten added.

The present invention will now be illustrated specifically by the following Examples.

EXAMPLE 1

To 200 g aliquots of hard-wheat flour having a protein content of 13.5% were added L-ascorbic acid in amounts indicated in Table 1 given below and 120 ml of water. The resultant mixtures each were kneaded, and the dough-like, hydrated flour mixture as formed was washed with water to effect separation and removal of starch from the dough in accordance with the Martin process and to give a modified gluten product as the bread improver (A) of this invention. The modified gluten product so obtained was freeze-dried and ground into powdery gluten sample. The whiteness and brightness of each of the powdery gluten samples obtained were measured by a color difference meter (Model: "ND-101DC"; manufactured by Nihon Denshoku Kogyo K.K.) and the data of the measurement are shown in Table 1 below.

For the sake of comparison, a comparative, further powdery gluten sample was produced by the same procedure as above from another aliquot of the same wheat flour but without addition of L-ascorbic acid. A still further comparative powdery gluten sample was also produced by kneading 200 g of the same wheat flour and 120 ml of water into a dough but without the addition of L-ascorbic acid to the dough, separating the vital gluten from the resultant dough by the Martin process, adding to and thoroughly mixing with the vital gluten L-ascorbic acid in an amount of 100 ppm based on the dry weight of the vital gluten and then freeze-drying and grinding the resultant mixture. The tests with those two comparative powdery gluten samples are shown as Comparative Examples in Table 1.

The powdery gluten samples of the modified gluten product of this invention obtained above in this Example and the comparative gluten samples were separately added in a proportion of 0.5% to seven aliquots of wheat flour. Each of the resultant farinaceous flour mixes was admixed with the further additives shown in accordance with the below-described formulation, and the resulting admixture was developed to a bread-making dough and the production of open top loaves was carried out by the bread-making steps of a "no-time-dough" process.

The volumes of the resultant loaves were determined and are given in Table 1 below, in which there are also summarized the results of the paneller's evaluations conducted on the quality of the loaves in accordance with a rating standard shown in Table 2 below. Incidentally, a Control test was also made by preparing such a loaf from the dough of the same formulation and by the same bread-making process as in the Example above, except the addition of any gluten powder was omitted.

| Formulations of the bread-making dough | |
|---|---|
| Wheat flour (containing 0.5% of the above-described gluten powder added) | 300 g |
| Yeast food | 0.3 g |
| Yeast | 9 g |
| Common salt | 6 g |
| Sugar | 15 g |
| Skimmed milk powder | 6 g |
| Shortening | 15 g |
| Water | 192 ml |

| Bread-making steps for the "no-time-dough" process | |
|---|---|
| Mixing of dough: | All the above ingredients for the bread-making dough were placed together in a mixer and kneaded for 1 minute at low mixing speed and for 4.6 minutes at high mixing speed. |
| Temperature of kneaded dough: | 29° C. |
| Fermentation time: | 0 minute |
| Floor time: | 20 minutes. |
| Bench time: | 20 minutes. |
| Molding: | The dough was divided into two equal halves each of 250 g and shaped by a molder. |
| Pan proofing: | 45 minutes (temperature: 37° C.; Humidity: 83%) |
| Baking: | 25 minutes (temperature: 210° C.). |

TABLE 1

| Items of experimental conditions and observations | Example of this invention | | | | | Comparative Examples | | Control test |
|---|---|---|---|---|---|---|---|---|
| | Test 1 | Test 2 | Test 3 | Test 4 | Test 5 | Test 1 | Test 2 | |
| Proportion of L-ascorbic acid added in mg. (in term of ppm. per part of wheat folur) | 0.2 (1) | 2 (10) | 20 (100) | 200 (1000) | 300 (1500) | 0 (0) | (100 ppm. to gluten) | 0 |
| Time of addition of L-ascorbic acid | Added to wheat flour before dough formation | Likewise | Likewise | Likewise | Likewise | No addition | Addition to gluten itself | — |
| Date of measurement of powdery gluten samples added as bread improver | | | | | | | | |
| Brightness | 83.97 | 86.84 | 88.70 | 85.69 | 81.87 | 83.92 | 83.99 | — |
| Whiteness | 75.52 | 80.95 | 82.87 | 80.54 | 77.89 | 78.03 | 78.91 | |
| Volume of loaf: ml | 1650 | 1790 | 1950 | 1770 | 1670 | 1640 | 1650 | 1630 |
| Evaluations of quality of loaf (scored) | | | | | | | | |
| Crumb texture | 1.7 | 3.0 | 3.9 | 3.3 | 1.6 | 1.5 | 1.4 | 1.0 |
| External appearance | 2.0 | 3.2 | 4.0 | 3.0 | 2.1 | 2.0 | 2.1 | 1.0 |
| Crumb smoothness | 2.1 | 3.5 | 3.9 | 3.4 | 2.1 | 2.0 | 1.9 | 1.0 |
| Total score | 5.8 | 9.7 | 11.8 | 9.7 | 5.8 | 5.5 | 5.4 | 3.0 |
| Overall evaluation | G. | VG. | Ex. | VG. | G. | F. | F. | P. |

Notes in Table 1:
(1) The greater the values of brightness and whiteness, the brighter and whiter.
(2) The evaluation of the quality of each loaf was conducted by 10 panellers and the evaluated result is shown by the average values of scores given by the panellers.
(3) The results of the overall evaluation are expressed in accordance with the following rating standard.
Ex.: Excellent
VG.: Very good
G.: Good
F.: Fair
P.: Poor

TABLE 2

| | Standards for Evaluation | |
|---|---|---|
| Evaluated items | score | Description |
| Crumb texture | 4 | White texture, and well-extended thin cellular walls of crumb. |
| | 3 | Whitish texture, and slightly thick |

TABLE 2-continued

| Evaluated items | Standards for Evaluation | |
|---|---|---|
| | score | Description |
| | | cellular wall of crumb. |
| | 2 | Yellowish texture, round cells and slightly thick cellular walls. |
| | 1 | Yellow texture, round cells and thick cellular walls. |
| External appearance | 4 | Sufficiently extended and smooth. |
| | 3 | Somewhat extended and somewhat smooth. |
| | 2 | Somewhat poorly extended, rough and red. |
| | 1 | Poorly extended and connected, very rough, and red. |
| Crumb smoothness (chew feeling in mouth) | 4 | Soft and smooth. |
| | 3 | Somewhat soft and smooth. |
| | 2 | Slightly hard and somewhat sticky-paste-like feeling. |
| | 1 | Hard, sticky-paste-like feeling and inferior smoothness in mouth. |

EXAMPLE 2

Powdery samples of the modified gluten product of this invention were obtained in the same manner as in Example 1 except that the kind and proportion of the oxidizing agent added were changed as shown in Table 3 below. The samples of modified gluten product were added in a proportion of 0.5% to three aliquots of wheat flour, respectively. Using the resultant wheat flour mixes separately, the bread-making doughs were prepared in accordance with the under-mentioned formulation of the bread-making dough, and open-top loaves were produced by the bread-making steps of the straight-dough bakery process as specified below.

The brightness and whiteness measured of the powdery samples of modified gluten product as well as the determined volumes of the resultant loaves are shown in Table 3 below, where there is also summarized the results of the evaluation conducted on the properties of the loaves in accordance with the rating standards of Table 2 shown in the Example 1 above. Incidentally, Comparative Example and Control tests were made in the same manner as in the Comparative Example 1 and Control test of the Example 1 above.

| Formulation of the bread-making dough | |
|---|---|
| Wheat flour (containing 0.5% of the modified gluten powder prepared as above) | 300 g |
| Yeast food | 0.3 g |
| Yeast | 6 g |
| Common salt | 6 g |
| Sugar | 15 g |
| Skimmed milk powder | 6 g |
| Shortening | 15 g |
| Water | 204 ml |

| Bread-making steps for the straight-dough Process | |
|---|---|
| Mixing of dough: | All the ingredients for the dough other than the shortening were placed together in a mixer and kneaded for 5 minutes at low mixing speed and for 2 minutes at high mixing speed. The shortening was then added, followed by further kneading the dough for 1.5 minutes at high mixing speed. |
| Temperature of kneaded dough: | 27° C. |
| Fermentation: | After the primary fermentation of 90 minutes, the leavened dough was punched, followed by the secondary fermentation for 30 minutes. |
| Bench time: | 20 minutes. |
| Molding: | The dough was divided into two equal halves each of 250 g and shaped by a molder. |
| Pan proofing: | 45 minutes (temperature: 37° C.; humidity: 83%) |
| Baking: | 30 minutes (temperature: 210° C.). |

TABLE 3

| Items of experimental conditions and observations | Example of this invention | | | Comparative Example | Control test |
|---|---|---|---|---|---|
| | Test 1 | Test 2 | Test 3 | | |
| Amount added of and nature of oxidizing agent used | 150 ppm. of potassium bromate | 100 ppm. of ammonium persulfate | 100 ppm. of L-ascorbic acid + 100 ppm. of potassium iodate | No addition | No addition |
| Data of measurement of powdery gluten samples added as bread improver | | | | | |
| Brightness | 86.42 | 85.32 | 88.94 | 83.92 | — |
| Whiteness | 82.88 | 82.23 | 83.56 | 78.03 | — |
| Volume of loaf: ml | 1920 | 1910 | 1970 | 1640 | 1630 |
| Evaluations of quality of loaf (scored) | | | | | |
| Crumb texture | 3.9 | 3.7 | 4.0 | 1.5 | 1.0 |
| External appearance | 3.8 | 3.8 | 4.0 | 2.0 | 1.0 |
| Crumb smoothness | 3.7 | 3.6 | 3.9 | 2.0 | 1.0 |
| Total score | 11.4 | 11.1 | 11.9 | 5.5 | 3.0 |
| Overall evaluation | VG. | VG. | VG. | F. | P. |

EXAMPLE 3

The modified gluten powder of this invention obtained in Example 1 above was added in proportions indicated in Table 4 below to aliquots of wheat flour. Using the resultant wheat flour mixes separately, open top loaves were produced in accordance with the formulations and bread-making steps of the sponge-dough bakery process as described below. The volumes of the loaf products and results of the paneller's evaluation conducted on the quality of loaves in accordance with the rating standard of Table 2 are shown in Table 4 below, along with the results of the measurement on the crumb whiteness of the loaves (as measured by a color difference meter similar to that used in Example 1). Incidentally, a Control test was made by repeating the above test with the same formulation and by the same sponge-dough process except that the addition of any gluten powder was omitted.

| Formulations | |
|---|---|
| (1) Sponge formulation | |
| Wheat flour | 700 g |
| Yeast | 20 g |
| Yeast food | 1 g |
| Water | 400 ml |
| (2) Formulation for final dough (the remaining ingredients to be supplemented to the sponge): | |
| Wheat flour | 300 g |
| Sugar | 50 g |
| Common salt | 20 g |
| Shortening | 50 g |
| Skimmed milk powder | 20 g |
| Water | 280 ml |

| Bread-making steps for the sponge-dough bakery process | |
|---|---|
| Mixing of dough for the sponge | All the ingredients for the sponge formulation were placed together in a mixer, and kneaded at low mixing speed for 2 minutes and at medium mixing speed for 2 minutes. |
| Kneaded dough temperature: | 24° C. |
| Fermentation for sponge: | 4 hours (temperature: 27° C., humidity: 70%) |
| Mixing of the final dough: | All the supplemental ingredients for the final dough, other than the shortening were added to the sponge, followed by kneading at low mixing speed for 1 minute and at medium mixing speed for further 4 minutes. Shortening was then added, followed by mixing at medium mixing speed for 2 minutes and at high mixing speed for further 3 minutes. |
| Temperature of finally kneaded dough: | 27° C. |
| Floor time: | 25 minutes. |
| Dividing and rounding: | Divided at a rate of 250 g per piece. |
| Bench time: | 20 minutes. |
| Molding: | Two 250-gram-weighing dough pieces were deposited in each pan. |
| Pan proofing: | 40 minutes (temperature: 37° C.; humidity: 83%). |
| Baking: | 30 minutes (temperature: 210° C.). |

TABLE 4

| Items of experimental conditions and observations | Example of this invention and Comparative Example | | | | | | | Control test |
|---|---|---|---|---|---|---|---|---|
| | Test 1 | Test 2 | Test 3 | Test 4 | Test 5 | Test 6 | Test 7 | |
| Amount of a powdery sample of the modified gluten product added as bread improver (% by weight) | 0.05 | 0.1 | 1 | 1 | 1 | 10 | 15 | 0 |
| Time of addition of the powdery sample of the modified gluten product | Whole amount of the gluten sample added to wheat flour for use in sponge formation | Same | Same | Whole amount of the gluten sample added to wheat flour for use in final dough formation | A part of the gluten sample added at a rate of 0.5% in wheat flour for use in sponge formation of the gluten sample added at a rate of 0.5% to wheat flour for use in final dough formation | Whole amount of the gluten sample added to wheat flour for use in sponge formation | Whole amount of the gluten sample added to wheat flour for use in sponge formation | addition |
| Volume of loaf: ml | 1920 | 1980 | 2120 | 1990 | 2090 | 1960 | 1850 | 1900 |
| Whiteness of the loaf crumb | 74.07 | 75.20 | 76.00 | 75.13 | 75.84 | 75.00 | 73.91 | 74.00 |
| Evaluations of quality of loaf (scored) | | | | | | | | |
| Crumb texture | 2.1 | 3.5 | 4.0 | 3.9 | 4.0 | 3.4 | 1.7 | 2.0 |
| External appearance | 2.1 | 3.7 | 4.0 | 4.0 | 4.0 | 3.7 | 1.9 | 2.1 |
| Crumb smoothness | 2.1 | 3.7 | 4.0 | 3.9 | 3.9 | 3.1 | 1.5 | 2.1 |
| Total score | 6.3 | 10.9 | 12.0 | 11.8 | 11.9 | 10.2 | 5.1 | 6.2 |
| Overall evaluation | P. | G. | VG. | VG. | VG. | G. | P. | P. |

EXAMPLES 4-7

To 200 gram-aliquots of a bread wheat flour (water content: 14.2%, and protein content: 12.5%), L-ascorbic acid and water were added in amounts indicated in Table 5 below. The resultant mixtures were separately mixed and agitated at room temperature (20° C.) under such agitation conditions shown in Table 5 to obtain batter-like hydrated flour mixtures. These batters were separately then centrifuged at revolution speed of 3,000 rpm. By this centrifugation, each of the batters was fractionated into three layers. These were a layer comprising the water-insoluble gluten product, a supernatant layer comprising the aqueous phase containing the water-soluble proteinaceous substance dissolved therein, and a precipitate layer substantially comprising the starch substance and any other water-insoluble matters. The modified gluten product of this invention was then separated from the aqueous supernatant phase containing the water-soluble substances as well as from the water-insoluble starch substance. The samples of the gluten product so separated were then individually freeze-dried and ground to give powdery samples of the modified gluten product.

The dry powdery samples of the modified gluten product so recovered from the batters were tested as the additive to the farinaceous flour and found to exhibit the effects of improving the properties of bread, as tested similarly to the samples of the modified gluten product which were obtained in the Examples 1 and 2 given hereinbefore.

particles (substantially comprising the gluten, the starch substance and any other water-insoluble matters) of wheat flour from the water phase within 1 minute upon its static standing. The result of the observation on this segregation is shown in Table 6 below. After it was confirmed that the batter did not give rise to the segregation of the water-insoluble particles of the wheat flour within 1 minute of the static standing, said batter was then centrifuged at a rotation speed of 3,000 rpm. This was done to provide separately a fraction comprising the modified gluten product; a fraction comprising the supernatant aqueous phase containing the water-soluble proteinaceous substance dissolved therein., and a precipitate fraction substantially comprising the starch substance, which were each initially present in said batter. The modified gluten product was then separated and well washed with water to remove the contaminative starch residue therefrom. The yield of the gluten ball (wet gluten) so recovered was determined and is shown in Table 6 below.

The aqueous supernatant phase separated was then freeze-dried to give a powder sample comprising the water-soluble proteinaceous substance as the bread improver (B) of this invention.

For comparison purpose, the above procedure was repeated without the addition of L-ascorbic acid, so that a comparative, bread-improver sample was prepared from the batter-like hydrated flour mixture containing no L-ascorbic acid (Comparative Example).

(ii) The bread improver obtained in the Example 8 above and the comparative, bread-improver sample

TABLE 5

| Items of experimental conditions and observations | Example of this invention | | | |
|---|---|---|---|---|
| | Example 4 | Example 5 | Example 6 | Example 7 |
| Amount of L-ascorbic acid added: in mg. | 2 | 20 | 20 | 40 |
| (in term of ppm. per part of wheat flour) | (10) | (100) | (100) | (200) |
| Amount of water added: in ml. (in term of | 600 | 500 | 300 | 400 |
| % by weight of wheat flour) | (300) | (250) | (150) | (200) |
| Agitation conditions | | | | |
| Rotary speed: rpm. | 14000 | 10000 | 10000 | 10000 |
| Agitation time: minutes | 15 | 10 | 10 | 10 |
| Yield of the water-insoluble modified gluten product (as wet gluten): in gram | | | | |
| (Ratio of the yield of the modified | 68.8 | 75.9 | 79.7 | 76.6 |
| gluten product in term of times the total protein content present in the raw wheat flour) | (2.8) | (3.1) | (3.2) | (3.1) |
| Amount of the modified gluten product added: % (in term of % by weight of | | | | |
| wheat flour for use in the bread-making dough) | 0.5 | 0.5 | 0.5 | 0.5 |
| Volume of bread: ml | 1800 | 1940 | 1900 | 1870 |
| Evaluations of quality of load (scored) | | | | |
| Crumb texture | 1.9 | 3.9 | 3.9 | 3.0 |
| External appearance | 1.7 | 3.9 | 3.5 | 3.0 |
| Crumb smoothness | 2.0 | 3.9 | 3.8 | 3.0 |
| Total score | 5.6 | 11.7 | 11.2 | 9.0 |
| Overall evaluation | G. | Ex. | Ex. | VG. |

EXAMPLE 8

(i) To 200 gram-aliquots of a bread wheat flour (water content:.14.2%, and protein content: 12.5%), L-ascorbic acid and water were added in amounts indicated in Table 6 below. The resulting mixtures were individually mixed and agitated at room temperature (20° C.) under such agitation conditions shown in Table 6 to prepare the kneaded and batter-like, hydrated flour mixtures. Each of these batters was allowed to stand statically, and it was observed whether the batter began to give rise to the segregation of the water-insoluble obtained in the Comparative Example above were separately used and added to aliquots of a farinaceous flour, from which there were then prepared the bread-making doughs in accordance with the formulation indicated below. Thereafter, the bread-making doughs were baked in accordance with the bread-making steps of the "no-time-dough" process indicated below. In this way, open top loaves were produced. A control test was also carried out by repeating the above process without the addition of any bread improver (namely, without the addition of either one of the bread improver of the Example 8 and the comparative bread improver sample of the Comparative Example above), so that open top loaf as the control specimen was produced.

The volume of the loaves so produced was determined, and the properties of these loaves were evaluated by 10 panellers in accordance with the rating standard shown in Table 2 of the Example 1 given hereinbefore. The determined volume of the loaf and the averaged scores of the evaluation so made on the quality of the loaf are summarized in Table 6 below, along with the results of the Comparative Example and the Control test.

| Bread-making steps of the "no-time-dough" process | |
|---|---|
| Baking: | 25 minutes (temperature: 210° C.). |

TABLE 6

| Items of experimental conditions and observations | Examples of this invention | | | | Comparative Example | Control test |
|---|---|---|---|---|---|---|
| | Test 1 | Test 2 | Test 3 | Test 4 | | |
| Amount of L-ascorbic acid added: in mg. (in term of ppm. per part of wheat flour) | 2 (10) | 20 (100) | 20 (100) | 40 (200) | 0 (0) | 0 |
| Amount of water added: in ml (in term of % by weight of wheat flour) | 600 (300) | 500 (250) | 300 (150) | 400 (200) | 500 (250) | — |
| Agitation conditions | | | | | | |
| Rotary speed: rpm. | 14000 | 10000 | 10000 | 10000 | 10000 | — |
| Agitation time: minutes | 15 | 10 | 10 | 10 | 10 | — |
| Segregation of the water-insoluble particles of wheat flour from water upon static standing of batter for 1 minute | Not observed | Not observed | Not observed | Not observed | Not observed | — |
| Centrifugation of batter | Effected | Effected | Effected | Effected | Effected | — |
| Yield of the modified gluten product (as gluten ball or wet gluten): in gram (Ratio of the yield of the modified gluten product in terms of times the total protein content present in the raw wheat flour) | 68.8 (2.8 folds) | 75.9 (3.1 folds) | 79.7 (3.2 folds) | 76.6 (3.1 folds) | 67.5 (2.7 folds) | — |
| Volume of bread: ml | 1800 | 1900 | 1920 | 1950 | 1690 | 1660 |
| Evaluations of quality of load (scored) | | | | | | |
| Crumb texture | 3.0 | 3.3 | 3.8 | 3.9 | 2.8 | 1.0 |
| External appearance | 3.0 | 3.6 | 3.8 | 3.9 | 2.8 | 1.0 |
| Crumb smoothness | 3.0 | 3.6 | 3.8 | 4.0 | 2.8 | 1.0 |
| Total score | 9.0 | 10.5 | 11.4 | 11.8 | 8.4 | 3.0 |
| Overall evaluation | G. | VG. | VG. | VG. | F. | P. |

| Formulation of dough for the "no-time-dough" process | |
|---|---|
| Wheat flour | 300 g |
| Bread improver added | 0.3 g |
| Yeast food | 0.3 g |
| Yeast | 9 g |
| Common salt | 6 g |
| Sugar | 15 g |
| Skimmed milk powder | 6 g |
| Shortening | 15 g |
| Water | 192 ml |

| Bread-making steps of the "no-time-dough" process | |
|---|---|
| Mixing of dough: | All the ingredient for the dough were placed together in a mixer and kneaded for 1 minute at low mixing speed and for 4.5 minutes at high mixing speed. |
| Fermentation time: | Zero minute. |
| Floor time: | 20 minutes. |
| Bench time: | 20 minutes. |
| Molding: | Dough was divided into two halves each of 250 g and then shaped by a molder. |
| Pan proofing: | 45 minutes (temperature: 37° C.; humidity: 83%). |

EXAMPLE 9

To five aliquots of the wheat flour of the same grade as employed in Example 8 above were added water and the oxidizing agent of the nature specified in Table 7 below and in the amounts indicated in Table 7. The resulting mixtures were individually mixed and agitated at room temperature (20° C) under the agitation conditions shown in Table 7 to prepare the kneaded and batter-like, hydrated flour mixtures. Each of these batters was subsequently processed in the same manner as in the Example 8 above to provide the samples of the bread improver (B) according to this invention.

The samples of the bread improver prepared in this Example 9 were separately added into aliquots of a farinaceous flour or the sponged dough in accordance with the procedure and amounts indicated in Table 7 below. The bread-making steps were then effected according to the sponge-dough bakery process using the formulations of the sponge and dough as well as the bread-making steps of the sponge-dough bakery process as indicated below. In this way, open top loaves containing the bread improver were produced. Besides, a Control test was also made by repeating the above process without the addition of any bread improver, so that open top loaf as a control speciemen was produced.

The volume of the loaves so produced was determined, and the properties or quality of these loaves were evaluated by 10 panellers in accordance with the rating standard shown in Table 2 of the Example 1 given hereinbefore. The determined volume of the load and the average scores of the evaluation so made on the quality of the load are summarized in Table 7, along with the result of the Control test.

| Formulation of the sponge-making dough for the sponge-dough process | |
|---|---|
| Wheat flour: | 700 g |
| Bread improver possibly added: | An amount specified in Table 7 |
| Yeast food: | 1 g |
| Yeast: | 20 g |
| Water: | 400 ml. |

| Formulation of the remaining ingredients to be supplemented to the sponge for making final dough | |
|---|---|
| Wheat flour: | 300 g |
| Bread improver possibly added: | An amount specified in Table 7 |
| Sugar | 50 g |
| Common salt | 20 g |
| Skimmed milk powder: | 20 g |
| Shortening: | 50 g |
| Water: | 250 ml. |

| Bread-making steps of the sponge-dough bakery process | |
|---|---|
| Mixing steps: | |
| Mixing of the sponge-making dough: | The first dough was prepared by kneading for 2 minutes at low mixing speed and for 2 minutes at medium mixing speed. |
| Mixing of the final dough: | The sponge prepared and all the supplemental ingredients other than the shortening were placed together in a mixer and mixed for 1 minutes at low mixing speed and then for 4 minutes at medium mixing speed. The shortening was then added, followed by kneading for 2 minutes at medium mixing speed and for 2.5 minutes at high mixing speed to prepare the final dough. |
| Fermentation: | 4 hours at temperature of 27° C. |
| Floor time: | 20 minutes. |
| Bench time: | 25 minutes. |
| Molding: | The final dough was divided into two halves each of 250 g and then shaped by a molder. |
| Pan proofing: | 40 minutes (temperature: 37° C.; humidity: 83%). |
| Baking: | 30 minutes (temperature: 210° C.). |

TABLE 7

| Item of experimental conditions and observations | Example of this invention | | | | | Control test |
|---|---|---|---|---|---|---|
| | Test 1 | Test 2 | Test 3 | Test 4 | Test 5 | |
| Nature of oxidizing agent | Potassium bromate | Potassium bromate | Ammonium persulfate | Potassium persulfate | Potassium bromate + L-ascorbic acid | — |
| Amount of oxidizing agent added: in mg (in term of ppm. per part of wheat flour) | 20 (100) | 20 (100) | 20 (100) | 20 (100) | 20 + 20 (100) (100) | — |
| Amount of water added: in ml. (in term of % by weight of wheat flour) | 500 (250) | 500 (250) | 500 (250) | 500 (250) | 500 (250) | — |
| Agitation conditions | | | | | | |
| Rotary speed: rpm. | 14000 | 14000 | 14000 | 14000 | 14000 | — |
| Agitation time: minutes | 10 | 10 | 10 | 10 | 10 | — |
| Segregation of the water-insoluble particles of wheat flour from water upon static standing of batter for 1 minute | Not observed | Not observed | Not observed | Not observed | Not observed | — |
| Yield of the modified gluten product (as gluten ball or wet gluten): in gram (Ratio of the yield of the modified gluten product in term of times the total protein content present in the raw wheat flour) | 73.0 (2.9 folds) | 73.0 (2.9 folds) | 72.4 (2.9 folds) | 72.8 (2.9 folds) | 72.0 (2.9 folds) | — |
| Amount of bread improver added to sponge: in gram (in term of percent) | 5 (0.5) | 2 (0.2) | 5 (0.5) | 5 (0.5) | 5 (0.5) | — |
| Amount of bread improver added to final dough: in gram (in term of percent) | — | 3 (0.3) | — | — | — | — |
| Volume of bread: ml | 1900 | 1920 | 1860 | 1860 | 1950 | 1800 |
| Evaluations of quality of loaf (scored) | | | | | | |
| Crumb texture | 3.4 | 3.3 | 3.1 | 3.0 | 3.9 | 1.5 |
| External appearance | 3.4 | 3.5 | 3.0 | 3.1 | 4.0 | 1.5 |
| Crumb smoothness | 3.5 | 3.4 | 3.0 | 3.1 | 4.0 | 1.5 |
| Total score | 10.3 | 10.2 | 9.1 | 9.2 | 11.9 | 4.5 |
| Overall evaluation | G. | G. | G. | G. | VG. | P. |

EXAMPLE 10

To three aliquots of wheat flour of the same grade as used in Example 8 above were added water and the oxidizing agent specified in Table 8 below and in the amounts indicated in Table 8. The resulting mixtures were individually mixed and agitated at 27° C in a vertical dough mixer for 5 minutes at low mixing speed and for 2 minutes at high mixing speed to provide the semisolid and dough-like, hydrated flour mixtures. Each of these doughs was immersed and allowed to stand in a volume (5 liters) of water placed in a bowl, followed by repeatedly and gently washing the dough with water to remove therefrom most of the starch and the other soluble materials, until the gluten product was formed as a rubbery mass and also an aqueous and milky suspension containing the starch substance was obtained. This milky suspension comprised the aqueous phase which was containing the water-soluble proteinaceous substance dissolved therein and the starch particles dispersed in said aqueous phase. This milky suspension was passed through a screen of 100 mesh to remove completely the remaining small aggregates of the gluten, and thereafter the resulting aqueous filtrate was centrifuged (at 3,000 rpm.) to remove the starch substance or fraction therefrom. The aqueous supernatant phase so obtained was then freeze-dried and ground to afford a powder sample of the bread improver (B) of this invention comprising said water-soluble proteinaceous substance.

The powdery samples of the bread improver so prepared in this Example 10 were individually used and added into aliquots of a farinaceous flour so as to prepare the bread-making doughs in accordance with the formulation as indicated in Table 8 below. The bread-making process was then carried out using the formulations of the dough as well as the bread-making steps of the straight bakery process as indicated below. In this way, open top loaves containing the bread improver were produced. A comparative Example was conducted by repeating the above process except that the addition of the oxidizing agent to wheat flour was omitted. Besides, a control test was also made by repeating the above process without the addition of any bread improver, so that open top loaf as a control speciemen was produced.

The volume of the loaves so produced was determined, and the properties or quality of these loaves were evaluated by 10 panellers in accordance with the rating standard shown in Table 2 of the Example 1 given hereinbefore. The determined volume of the loaf and the averaged scores of the evaluation so made on the quality of the loaf are summarized in Table 8, along with the results of the Control test.

| Formulation for the bread-making dough according to straight bakery process | |
|---|---|
| Wheat flour: | 2,000 g |
| Bread improver as | 8 g |
| prepared above: | |
| Yeast food: | 0.2 g |
| Yeast: | 0.2 g |
| Common salt: | 40 g |
| Sugar: | 100 g |
| Skimmed milk powder: | 40 g |
| Shortening: | 100 g |
| Water | 1,340 ml |

| Bread-making steps of the straight bakery process | |
|---|---|
| Mixing of dough: | All the ingredients for the dough other than the shortening were placed together in a mixer and kneaded for 2 minutes at low mixing speed for 2 minutes at medium speed, and for 2 minutes at high mixing speed. The shortening was then added, followed by further kneading the dough for 2 minutes at medium mixing speed and for 2.5 minutes at high mixing speed. |
| Temperature of kneaded dough: | 27° C. |
| Fermentation: | After the primary fermentation of 90 minutes at 27° C., the leavened dough was punched, followed by the secondary fermentation for 30 minutes at 27° C. |
| Dividing: | The dough was divided into two equal halves each of 250 g and shaped by a molder. |
| Bench time: | 25 minutes. |
| Pan proofing: | 40 minutes (temperature: 37° C., humidity: 83%). |
| Baking: | 30 minutes (temperature: 210° C.). |

TABLE 8

| Items of experimental conditions and observations | Example of this invention | | | Comparative Example | Control test |
|---|---|---|---|---|---|
| | Test 1 | Test 2 | Test 3 | | |
| Nature of oxidizing agent | L-ascorbic acid | L-ascorbic acid | L-ascorbic acid | — | — |
| Amount of oxidizing agent added: in mg. (in term of ppm. per part of wheat flour) | 30 (150) | 30 (150) | 30 (150) | 0 (0) | — |
| Amount of water added: in ml. (in term of % by weight of wheat flour) | 100 (50) | 200 (100) | 300 (150) | 200 (100) | |
| Volume of bread: ml. | 1850 | 1890 | 1900 | 1800 | 1780 |
| Evaluations of quality of loaf (scored) | | | | | |
| Crumb texture | 3.0 | 3.3 | 3.5 | 2.0 | 1.5 |
| External appearance | 3.1 | 3.2 | 3.4 | 2.0 | 1.5 |
| Crumb smoothness | 3.1 | 3.4 | 3.6 | 2.1 | 1.5 |
| Total score | 9.2 | 9.9 | 10.5 | 6.1 | 4.5 |
| Overall evaluation | G. | G. | VG. | F. | P. |

EXAMPLE 11

(i) To 200 gram-aliquots of a bread wheat flour (water content: 14.2%, and protein content: 12.5%), L-ascrobic acid and water were added in amounts indicated in Table 9 below. The resulting mixtures were individually mixed and agitated at room temperature (20° C.) under such agitation conditions shown in Table 9 to prepare the kneaded and batter-like hydrated flour mixtures. Each of these batters was allowed to stand statically, and it was observed whether the batter began to give rise to the segregation of the water-insoluble particles of wheat flour from the water phase within 1 minute of its static standing. The result of the observation on this segregation is shown in Table 9 below. After it was confirmed that the batter did not give rise to the segregation of the water-insoluble particles of the wheat flour within 1 minute of the static standing, said batter was then centrifuged at a rotation speed of 3,000 rpm. This provided separately a fraction comprising the modified gluten groduct; a fraction comprising the supernatant aqueous phase containing the water-soluble proteinaceous substance dissolved therein; and a precipitate fraction substantially comprising the starch substance, which were each initially present in said batter. The modified gluten product was then separated and well washed with water to remove the contaminative starch residue therefrom. The yield of the gluten ball (wet gluten) so recovered was determined and is shown in Table 9 below.

The aqueous supernatant phase was also separated, and this aqueous supernatant phase and the modified gluten product recovered (as wet gluten) were then individually freeze-dried and ground to give a powdery sample of the bread improver (B) of this invention comprising the water-soluble proteinaceous substance, and a powdery sample of the bread improver (A) of this invention comprising the water-insoluble, modified gluten product, respectively.

The powdery sample of the bread improver (B) obtained was admixed with the powdery sample of the bread improver (A) obtained at a ratio of 1 part of the former (B) to 5 parts of the latter (A) on the dry weight basis, to prepare a sample of the bread improver (C) comprising the proteinaceous composition consisting essentially of the mixture of said water-soluble proteinaceous material and said water-insoluble modified gluten product.

On the other hand, an aliquot of the above-mentioned batter was directly freeze-dried without being centrifuged, so that a comparative sample of a bread improver was produced (Comparative Example A). Besides, the preparation of the above-mentioned batter from the wheat flour and water was repeated without the addition of L-ascorbic acid, and the batter so prepared was directly freeze-dried to prepare a second comparative sample of a bread improver (Comparative Example B).

(ii) The sample of the bread improver (C) of this invention as prepared in this Example 11, as well as the comparative bread improver samples as prepared in the above Comparative Examples A and B were individually used and added to aliquots of a farinaceous flour in accordance with the formulation of the dough as specified below. Then, the bread-making doughs were prepared and baked in accordance with the bread-making steps of the "no-time-dough" process as indicated below. In this way, open top loaves were produced.

Furthermore, a control test was carried out by repeating the above process without the addition of any bread improver (namely, without the addition of either one of the bread improver of the Example 11 and the comparative bread improver samples of the above Comparative Examples A and B), so that open top loaf as the control specimen was produced.

The volume of the loaves so produced was determined, and the properties of these loaves were evaluated by 10 panellers in accordance with the rating standard shown in Table 2 of the Example 1 given hereinbefore. The determined volume of the loaf and the averaged scores of the evaluation so made on the quality of the loaf are summarized in Table 9 below, along with the results of the Comparative Examples and the Control test.

| Formulation of the dough for the "no-time-dough" process | |
| --- | --- |
| Wheat flour: | 300 g |
| Bread improver added: | 6 g |
| Yeast food: | 0.3 g |
| Yeast: | 9 g |
| Common salt: | 6 g |
| Sugar: | 15 g |
| Skimmed milk powder: | 6 g |
| Shortening: | 15 g |
| Water | 192 ml |

| Bread-making steps for the "no-time-dough" process | |
| --- | --- |
| Mixing of dough: | All the ingredient for the dough were placed together in a mixer and kneaded for 1 minute at low mixing speed and for 4.5 minutes at high mixing speed. |
| Fermentation time: | Zero minute |
| Floor time: | 20 minutes |
| Bench time: | 20 minutes |
| Molding: | Dough was divided into two halves each of 250 g and then shaped by a molder. |
| Pan proofing: | 45 minutes (temperature: 37° C.; humidity: 83%). |
| Baking: | 25 minutes (temperature: 210° C.). |

TABLE 9

| Items of experimental conditions and observations | Examples of this invention | | | | | Comparative Example A | Comparative Example B | Control test |
| --- | --- | --- | --- | --- | --- | --- | --- | --- |
| | Test 1 | Test 2 | Test 3 | Test 4 | Test 5 | | | |
| Amount of L-ascorbic acid added: | | | | | | | | |
| in mg. (in term of ppm. per part of wheat flour) | 2 (10) | 20 (100) | 20 (100) | 40 (200) | 200 (1000) | 20 (100) | 0 (0) | 0 |
| Amount of water added: in ml (in term of % by weight of wheat flour) | 600 (300) | 500 (250) | 300 (150) | 400 (200) | 600 (300) | 250 (100) | 500 (250) | — |
| Agitation conditions | | | | | | | | |
| Rotary speed: rpm. | 14000 | 10000 | 10000 | 10000 | 7000 | 10000 | 10000 | — |
| Agitation time: minutes | 15 | 10 | 10 | 10 | 2 | 10 | 10 | — |
| Segregation of the water-insoluble particles of wheat flour from water upon static standing of batter for 1 minute | Not observed | Not observed | Not observed | Not observed | Not observed | Not observed | Not observed | — |

Not

TABLE 9-continued

| Items of experimental conditions and observations | Examples of this invention | | | | | Comparative Example A | Comparative Example B | Control test |
| --- | --- | --- | --- | --- | --- | --- | --- | --- |
| | Test 1 | Test 2 | Test 3 | Test 4 | Test 5 | | | |
| Centrifugation of batter | Effected | Effected | Effected | Effected | Effected | Effected | Effected | — |
| Yield of the modified gluten product (as gluten ball or wet gluten): in gram (Ratio of the yield of the modified gluten product in terms of times the total protein content in the raw wheat flour) | 68.8 (2.8 folds) | 75.9 (3.1 folds) | 79.7 (3.2 folds) | 76.6 (3.1 folds) | 74.9 (3.0 folds) | — | 67.5 (2.7 folds) | — |
| Volume of bread: ml | 1820 | 1900 | 1950 | 1980 | 1820 | 1750 | 1720 | 1680 |
| Evaluations of quality of loaf (scored) | | | | | | | | |
| Crumb texture | 3.2 | 3.4 | 3.8 | 4.0 | 3.2 | 2.9 | 2.8 | 1.0 |
| External appearance | 3.0 | 3.7 | 3.9 | 4.0 | 3.1 | 2.8 | 2.8 | 1.0 |
| Crumb smoothness | 3.0 | 3.6 | 3.9 | 4.0 | 3.3 | 3.0 | 2.8 | 1.0 |
| Total score | 9.2 | 10.7 | 11.6 | 12.0 | 9.6 | 8.7 | 8.4 | 3.0 |
| Overall evaluation | G. | VG. | VG. | VG. | G. | F. | F. | P. |

EXAMPLE 12

The exemplary sample (i) of the bread improver (C) as prepared in Test 4 of Example 11 above (this sample was composed of a proteinaceous composition which was prepared by kneading the mixture of wheat flour, 200 ppm of L-ascorbic acid and water in a proportion of 200% of water by weight of wheat flour, recovering the modified gluten product and the water-soluble proteinaceous substance or fraction, respectively from the resultant batter-like hydrated flour mixture kneaded, and then admixing the water-soluble proteinaceous substance with the modified gluten product at a ratio of 1:5 by weight, as described in the Example 11), the first comparative sample (ii) of bread improver as prepared in Comparative Example A of Example 11 (this sample was composed of the powder which was prepared by directly freeze-drying the batter as formed in Example 11 without separating the modified gluten product and the water-soluble proteinaceous substance or fraction the centrifugation of the batter), and the second comparative sample (iii) of bread improver as prepared in Comparative Example B of Example 11 (this sample was composed of the powder which was prepared by repeating the procedure of preparing the batter according to Example 11 but without the addition of L-ascorbic acid, and then freeze-drying the resultant batter directly) were individually used and added to aliquots of wheat flour of the same grade as employed in Example 11. The resultant farinaceous flour mixes were individually used and formulated to prepare the doughs for making bread in accordance with the dough formulation as indicated below. Each of these doughs prepared were then processed and baked according to the bread-making steps of the straight bakery process as specified below. In this bakery process, the dough batches were divided into two groups; namely such a first group where the dividing, scaling and rounding of the dough after the completed secondary fermentation were conducted exclusively by manual workings of men; and a second group where the dividing, scaling and rounding of the dough after the completed secondary fermentation were conducted exclusively by the mechanical workings by means of an automatic dough-dividing machine and an automatic dough-rounding machine. By comparing the properties of the bread as prepared from the manually worked doughs with the properties of the bread as prepared from the mechanically worked doughs, the tolerance of these doughs to the mechanical workings were evaluated.

A control test was also made by repeating the above procedures except that the use of any bread improver was omitted. The evaluation of the properties of the bread products was made by 10 panellers according to the rating standard shown in Table 2 of the Example 1 given hereinbefore, and the average scores of the evaluation ar summarized in Table 10 below.

| Formulation of dough for the straight bakery process | |
| --- | --- |
| Wheat flour | 3,000 g |
| Bread improver as prepared above | 60 g |
| Yeast food | 3 g |
| Yeast | 60 g |
| Common salt | 60 g |
| Sugar | 150 g |
| Skimmed milk powder | 60 g |
| Shortening | 150 g |
| Water | 1,950 ml |

| Bread-making steps for the straight bakery process | |
| --- | --- |
| Mixing of dough: | All the ingredients for the dough other than the shortening were placed together in a mixer and kneaded for 2 minutes at low mixing speed for 2 minutes at medium speed, and for 2 minutes at high mixing speed. The shortening was then added, followed by further kneading the dough for 2 minutes at medium mixing speed and for 2.5 minutes at high mixing speed. |
| Fermentation: | After the primary fermentation of 90 minutes at 27° C., the leavened dough was punched, followed by the secondary fermentation for 30 minutes at 27° C. |
| Dividing: | Manual working; A dough was divided by hands of men into two equal halves each of 250 g. Mechanical working: dough was divided into two equal halves each of 250 g by means of an automatic dividing machine. |
| Rounding: | Manual working; Rounding was made by hands of men. Mechanical working; Rounding |

-continued

| Bread-making steps for the straight bakery process | |
|---|---|
| | was made by means of an automatic rounding machine. |
| Bench time: | 25 minutes. |
| Molding: | The dough was shaped by a molder. |
| Pan proofing: | 40 minutes (temperature: 37° C.; humidity: 83%) |
| Baking: | 30 minutes (temperature: 210° C.). | former (B) to 80 parts of the latter (A) on the dry weight basis, to prepare a sample of the bread improver (C) comprising the proteinaceous composition consisting essentially of the mixture of said water-soluble proteinaceous substance and said water-insoluble modified gluten product.

Besides, a further sample of the bread improver (C) of this invention was also prepared by admixing 1 part by weight of the water-soluble proteinaceous substance prepared by the above procedure (as the sample mentioned just above of the bread improver (B) of this in-

TABLE 10

| Items | Bread improver of Example 11,Test 4 | | Bread improver of Comparative Example A of Example 11 | | Bread improver of Comparative B of Example 11 | | Control test | |
|---|---|---|---|---|---|---|---|---|
| Workings | Manual | Mechanical | Manual | Mechanical | Manual | Mechanical | Manual | Mechanical |
| Volume of loaf: ml | 1920 | 1910 | 1860 | 1800 | 1820 | 1740 | 1800 | 1740 |
| Evaluation of quality of loaf (scored) | | | | | | | | |
| Crumb texture | 3.8 | 3.8 | 2.6 | 2.2 | 2.5 | 2.1 | 1.6 | 1.0 |
| External appearance | 3.8 | 3.6 | 2.7 | 2.4 | 2.5 | 2.1 | 1.6 | 1.2 |
| Crumb smoothness | 3.8 | 3.7 | 2.5 | 2.1 | 2.6 | 2.1 | 1.6 | 1.4 |
| Total score | 11.4 | 11.1 | 7.8 | 6.7 | 7.6 | 6.4 | 4.8 | 3.6 |
| Overall evaluation | VG. | VG. | F. | P. | F. | P. | F. | P. |

EXAMPLE 13

(a) To 200 gram-aliquots of a bread wheat flour (water content: 14.2%, and protein content: 12.5%), employed in Example 11, water and an oxidizing agent as specified in Table 11 below were added in amounts indicated in Table 11 below. The resulting mixtures were individually mixed and agitated at room temperature (20° C.) under such agitation conditions shown in Table 1 to prepare the kneaded and batter-like hydrated flour mixtures. Each of these batters was allowed to stand statically, and it was observed whether the batter began to give rise to the segregation of the water-insoluble particles of wheat flour from the water phase within 1 minute upon its static standing. The result of the observation on this segregation is shown in Table 11 below. After it was confirmed that the batter did not give rise to the segregation of the water-insoluble particles of the wheat flour within 1 minute of the static standing, said batter was then centrifuged at a rotation speed of 3,000 rpm. This provided separately a fraction comprising the modified gluten product; a fraction comprising the supernatant aqueous phase containing the water-soluble proteinaceous substance dissolved therein; and a precipitate fraction substantially comprising the starch substance, which were each initially present in said batter. The modified gluten product was then separated and well washed with water to remove the contaminative starch residue therefrom. The yield of the gluten ball (wet gluten) so recovered was determined and is shown in Table 11 below.

The aqueous supernatant phase was also separated, and this aqueous supernatant phase and the modified gluten product recovered (as wet gluten) were then individually freeze-dried and ground to give a powdery sample of the bread improver (B) of this invention comprising the water-soluble proteinaceous substance, and a powdery sample of the bread improver (A) of this invention comprising the water-insoluble, modified gluten product, respectively.

The powdery sample of the bread improver (B) obtained was admixed with the powdery sample of the bread improver (A) obtained at a ratio of 1 part of the vention) with 80 parts by weight of such a modified gluten product which was produced by kneading a mixture of 100 g of bread wheat flour (protein content: 12.9%), 60 m( of water and 20 mg of L-ascrobic acid, then processing the resultant kneaded and dough-like hydrated flour mixture according to the Martin process to separate the wet gluten therefrom, and freeze-drying the gluten to produce a powder of the modified gluten product. This further sample of the bread improver (C) prepared as above was employed in Test 6 in Table 11 shown below.

(b) The exemplary samples prepared as above of the bread improver (C) according to this invention were individually used and added to aliquots of a farinaceous wheat flour. The resultant farinaceous flour mixes were individually used and formulated to prepare the doughs for making bread in accordance with the dough formulation for the sponge-dough bakery process. The doughs prepared were each processed and baked according to the bread-making steps of the sponge-dough bakery process as indicated below. In this way, open top loaves were producted. Besides, a control test was also made by repeating the above process without the addition of any bread improver.

The volume of the loaves produced was determined, and the properties of these loaves were evaluated by 10 panellers in accordance with the rating standard shown in Table 2 of the Example 1 given hereinbefore. The determined volume of the load and the average scored of the evaluation so made on the quality of the loaf are summarized in Table 11 below, along with the results of the Comparative Examples and the Control test.

| Formulation of the sponge-making dough for the sponge-dough process | |
|---|---|
| Wheat flour | 700 g |
| Bread improver possibly added | An amount specified in Table 11 |
| Yeast food | 1.0 g |
| Yeast | 20 g |
| Water | 400 ml |

| Formulation of the remaining ingredients to be supplemented to the sponge for making final dough | |
|---|---|
| Wheat flour | 300 g |
| Bread improver possibly added | An amount specified in Table 11 |
| Sugar | 50 g |
| Common salt | 20 g |
| Skimmed milk powder | 20 g |
| Shortening | 50 g |
| Water | 250 ml |

| Bread-making steps for the sponge-dough bakery process | |
|---|---|
| Bench time: | 25 minutes |
| Molding: | The final dough was divided into two halves each of 250 g and then shaped by a molder. |
| Pan proofing: | 40 minutes (temperature: 37° C.; humidity: 83%). |
| Baking: | 30 minutes (temperature: 210° C.). |

TABLE 11

| Item of experimental conditions and observations | Example of this invention | | | | | | Control test |
|---|---|---|---|---|---|---|---|
| | Test 1 | Test 2 | Test 3 | Test 4 | Test 5 | Test 6 | |
| Nature of oxidizing agent | Potassium iodate | Potassium iodate | Potassium bromate | Ammonium persulfate | Potassium bromate + L-ascorbic acid | L-ascorbic acid | — |
| Amount of oxidizing agent added: in mg (in term of ppm. per part of wheat flour) | 100 (500) | 100 (500) | 100 (500) | 100 (500) | 50 (250) + 50 (250) | 100 | — |
| Amount of water added: in ml. (in term of % by weight of wheat flour) | 400 (200) | 400 (200) | 400 (200) | 400 (200) | 400 (200) | 400 (200) | — |
| Agitation conditions | | | | | | | |
| Rotary speed: rpm. | 10000 | 10000 | 10000 | 10000 | 10000 | 10000 | — |
| Agitation time: minutes | 5 | 5 | 5 | 5 | 5 | 5 | |
| Segregation of the water-insoluble particles of wheat flour from water upon static standing of batter for 1 minute | Not observed | Not observed | Not observed | Not observed | Not observed | Not observed | — |
| Yield of the modified gluten product (as gluten ball or wet gluten): in gram (Ratio of the yield of the modified gluten product in term of times the total protein content present in the raw wheat flour) | 80.2 (3.2 folds) | 80.2 (3.2 folds) | 79.2 (3.2 folds) | 79.0 (3.2 folds) | 79.8 (3.2 folds) | 78.7 (3.1 folds) | — |
| Amount of bread improver added to sponge: in gram (in term of percent) | 1.0 (0.1) | 0.5 (0.05) | 1.0 (0.1) | 1.0 (0.1) | 1.0 (0.1) | 1.0 (0.1) | — |
| Amount of bread improver added to final dough: in gram (in term of percent) | — | 0.5 (0.05) | — | — | — | — | — |
| Volume of bread: ml | 1950 | 1920 | 1970 | 1920 | 2000 | 1990 | 1820 |
| Evaluations of quality of loaf (scored) | | | | | | | |
| Crumb texture | 3.2 | 3.2 | 3.6 | 3.2 | 3.9 | 3.9 | 1.6 |
| External appearance | 3.4 | 3.0 | 3.6 | 3.1 | 3.9 | 4.0 | 1.5 |
| Crumb smoothness | 3.5 | 3.2 | 3.7 | 3.2 | 3.9 | 3.9 | 1.5 |
| Total score | 10.1 | 9.4 | 10.9 | 9.5 | 11.7 | 11.8 | 4.6 |
| Overall evaluation | G. | G. | G. | G. | VG. | VG. | F. |

| Bread-making steps for the sponge-dough bakery process | |
|---|---|
| Mixing steps: | |
| Mixing of the sponge-making dough: | The first dough was prepared by kneading for 2 minutes at low mixing speed and for 2 minutes at medium mixing speed. |
| Mixing of the final dough: | The sponge prepared and all the supplemental ingredients other than the shortening were placed together in a mixer and mixed for 1 minutes at low mixing speed and then for 4 minutes at medium mixing speed. The shortening was then added, followed by kneading for 2 minutes at medium mixing speed and for 2.5 minutes at high mixing speed, to prepare the final dough. |
| Fermentation: | 4 hours at temperature of 27° C. |
| Floor time: | 20 minutes. |

We claim:

1. A bread improver intended for addition to wheat flour or dough for improvement of the volume, the crumb structure and the crumb smoothness of bread, wherein the bread improver is selected from the group consisting of (A) a bread improver consisting essentially of a water-insoluble, modified gluten product which is prepared by kneading a mixture of wheat flour, one or more oxidizing agents and water, then washing the resulting hydrated flour mixture so kneaded with water and separating the water-insoluable proteinaceous substance of said hydrated flour mixture, (B) a bread improver consisting essentially of a water-soluble proteinaceous substance which is prepared by kneading a mixture of wheat flour, one or more oxidizing agents and water to produce a hydrated flour mixture including starch, a water-soluble proteinaceous substance, a water-insoluble modified gluten product and other water-insoluble matters, then washing the resulting hydrated flour mixture so kneaded with water and separating the water-soluble proteinaceous substance for the starch, the water-insoluble modified gluten product and the other water-insoluble matters present in said hydrated flour mixture, and (C) a bread improver consisting essentially of a proteinaceous composition which is prepared by admixing the aforesaid water-insoluble, modified gluten product of the bread improve (A) with the aforesaid water-soluble proteinaceous substance of the bread improve (B).

2. A bread improver according to claim 1, wherein the mixture of wheat flour, one or more oxidizing agents and water contains 10 to 1000 ppm/of the oxidizing agent(s) based on the weight of the wheat flour.

3. A bread improver according to claim 1, wherein the oxidizing agent is selected from the group consisting of L-ascorbic acid, potassium bromate, potassium persulfate and potassium iodate.

4. A bread improver according to claim 1, wherein the mixture of wheat flour, oxidizing agents and water contains the water in a proportion of 40 to 300% based on the weight of the wheat flour.

5. A bread improver according to claim 1, wherein the mixture of wheat flour, oxidizing agents and water contains the water in a proportion of 40 to 150% based on the weight of the wheat flour.

6. A bread improver according to claim 1, wherein the mixture of wheat flour, oxidizing agents and water contains the water in a proportion of more than 150% to 300% based on the weight of the wheat flour.

7. A bread improver according to claim 1, consisting essentially of a water-insoluble, modified gluten product which is prepared by kneading a mixture of wheat flour, an oxidizing agent selected for the group consisting of L-ascorbic acid, potassium bromate, ammonium persulfate, potassium iodate and mixtures thereof in a proportion of 10 to 1,000 ppm of the oxidizing agent based on the weight of the wheat flour, and water to produce a hydrated flour mixture including starch, a water-soluble proteinaceous substance, a water-insoluble modified gluten product and other water-insoluble matters, in a proportion of 40 to 300% of water based on the weight of the wheat flour, at a temperature of up to 40° C., washing the resulting hydrated flour mixture so kneaded with water and separating the water-insoluble, modified gluten product from the starch, the other water-insoluble matters and the water-soluble proteinaceous substance in said kneaded, hydrated flour mixture 8. A bread improver according to claim 1 consisting essentially of a water-soluble proteinaceous substance which is prepared by kneading a mixture of wheat flour, an oxidizing agent selected from the group consisting of L-ascorbic acid, potassium bromate, ammonium persulfate, potassium iodate and mixtures thereof in a proportion of 10 to 1000 ppm of the oxidizing agent based on the weight of the wheat flour, and water to produce a hydrated flour mixture including starch, a water-soluble proteinaceous substance, a water-insoluble modified gluten product and other water-insoluble matters in a proportion of 40 to 300% of water based on the weight of the wheat flour, at a temperature of up to 40° C., washing the hydrated flour mixture so kneaded with water and separating the water-soluble proteinaceous substance from the starch, the water-insoluble, modified gluten product and the other water-insoluble matters present in said kneaded, hydrated flour mixture.

9. A bread improver according to claim 1 consisting essentially of a proteinaceous composition or mixture comprising the bread improver (A) consisting essentially of a water-insoluble, modified gluten product which is prepared by kneading a mixture of wheat flour, an oxidizing agent selected from the group consisting of L-ascorbic acid, potassium bromate, ammonium persulfate, potassium iodate and mixtures thereof n a proportion of 10 to 1000 ppm of the oxidizing agent based on the weight of the wheat flour, and water to produce a hydrated flour mixture including starch, a water-soluble proteinaceous substance, a water-insoluble modified gluten product and other water-insoluble matters, in a proportion of 40 to 300% of water based on the weight of the wheat flour, at a temperature of up to 40° C., washing the resulting hydrated flour mixture so kneaded with water and separating the water-insoluable, modified gluten product from the starch, the other water-insoluble matters and the water-soluble proteinaceous substance present in said kneaded, hydrated flour mixture, and the bread improver (B) consisting essentially of the water-soluble proteinaceous substance which is prepared by kneading a mixture of wheat flour, an oxidizing agent selected from the group consisting of L-ascorbic acid, potassium bromate, ammonium persulfate, potassium iodate and mixtures thereof in a proportion of 10 to 1000 ppm of the oxidizing agent based on the weight of the wheat flour, and water to produce a hydrated flour mixture including starch, a water-soluble proteinaceous substance, a water-insoluble modified gluten product and other water-insoluble matters, in a proportion of 40 to 300% of water based on the weight of the wheat flour, at a temperature of up to 40° C., washing the resulting hydrated flour mixture so kneaded with water and separating the water-soluble proteinaceous substance from the starch, the water-insoluble, modified gluten product and the other water-insoluble matters present in said kneaded, hydrated flour mixture at a ratio of the improver (A) to the improver (B) of 1:0.1-100 by weight.

10. A water-insoluble, modified gluten product, which is prepared by kneading a mixture of wheat flour, one or more oxidizing agents and water to produce a hydrated flour mixture including starch, a water-soluble proteinaceous substance, a water-insoluble, modified gluten product and other water-insoluble matters, then washing the resulting hydrated flour mixture so kneaded with water and separating the water-soluble, modified gluten product from the starch, the other water-insoluble matters and the water-soluble proteinaceous substance present in said kneaded, hydrated flour mixture.

11. A water-insoluble, modified gluten product, which is prepared by kneading a mixture of wheat flour, an oxidizing agent selected from the group consisting of L-ascorbic acid, potassium bromate, ammonium persulfate, potassium iodate and mixtures thereof in a total proportion of 10 to 1000 ppm of the oxidizing agent based on the weight of the wheat flour, and water to produce a hydrated flour mixture including starch, a water-soluble proteinaceous substance, a water-insoluble modified gluten product and other water-insoluble matters, in a proportion of 40% to 300% of water based on the weight of the wheat flour, at a temperature of up to 40° C., washing the resulting hydrated flour mixture so kneaded with water and separating the water-insoluble, modified gluten product from the starch, the other water-insoluble matters and the water-soluble proteinaceous substance present in the kneaded, hydrated flour mixture, said modified gluten product containing n-hexane-extractable free lipids at a total amount of about 1

5% to about 2% by weight and bound lipids which are not extractable with n-hexane but extractable with water-saturated n-butanol at a total amount of about 4% to about 5% by weight, and further said modified gluten product containing no substantial amount of the free aliphatic acids which are extractable with ethyl ether, but containing the monoglycerides in amounts higher than those present in conventional vital gluten.

* * * * *